United States Patent
Konig et al.

(10) Patent No.: US 10,210,172 B1
(45) Date of Patent: Feb. 19, 2019

(54) FILE SYSTEM INTEGRATION AND SYNCHRONIZATION BETWEEN CLIENT AND SERVER

(71) Applicant: GOOGLE INC., Mountain View, CA (US)

(72) Inventors: Stephen John Konig, Newcastle, WA (US); San Mehat, Seattle, WA (US); James Neil Weatherall, Kirkland, WA (US); Alexey Pakhunov, Torrance, CA (US); Gary Kacmarcik, Bothell, WA (US); Alex Carp, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 396 days.

(21) Appl. No.: 14/460,194

(22) Filed: Aug. 14, 2014

(51) Int. Cl.
| | |
|---|---|
| *G06F 17/30* | (2006.01) |
| *H04L 29/08* | (2006.01) |
| *G06F 3/0481* | (2013.01) |
| *G06F 3/0484* | (2013.01) |

(52) U.S. Cl.
CPC ...... *G06F 17/30174* (2013.01); *G06F 3/0481* (2013.01); *G06F 3/04842* (2013.01); *G06F 17/30115* (2013.01); *H04L 67/06* (2013.01)

(58) Field of Classification Search
CPC ............. G06F 17/30174; G06F 3/0481; G06F 3/04842; G06F 17/30115; H04L 67/06
See application file for complete search history.

(56) References Cited

U.S. PATENT DOCUMENTS

| | | | | | |
|---|---|---|---|---|---|
| 5,983,368 | A | * | 11/1999 | Noddings | G06F 11/3672 714/32 |
| 2005/0228798 | A1 | * | 10/2005 | Shepard | H04L 67/34 |
| 2013/0018939 | A1 | * | 1/2013 | Chawla | H04L 67/08 709/203 |

OTHER PUBLICATIONS

Harrison, CDIA Training and Test Preparation Guide 2000, Specialized Solutions Inc., pp. 68-70.*
Harrison, CDIA Training & Test Preparation Guide 2000, Specialized Solutions, pp. 68-71.*

* cited by examiner

*Primary Examiner* — Jason G Liao
(74) *Attorney, Agent, or Firm* — Brake Hughes Bellermann LLP (57) ABSTRACT

In one example embodiment, a non-transitory computer-readable storage medium having stored thereon computer executable program code which, when executed on a computer system, causes the computer system to perform a number of steps. The steps include receiving, at an application server, metadata representing at least one file system stored on a file storage system based on an application executing on the application server, preventing, at the application server, files associated with the file storage system from being downloaded to the application server, monitoring, by the application server, a request to open a file associated with the file storage system, determining the requested file is stored on the file storage system separate from the application server, and triggering, by the application server, a download of the requested file.

20 Claims, 7 Drawing Sheets

| Name | Size | Date | Type |
|---|---|---|---|
| File A | 10 | Date A | Image |
| ◯ File B | 2 | Date B | Spreadsheet |
| File C | 1 | Date C | -- |
| File D | 6 | Date D | Presentation |
| File E | 256 | Date E | Video |
| File F | 4 | Date F | Image |
| ◯ File G | 1000 | Date G | Text |
| File H | 8 | Date H | PDF |
| File I | 4 | Date I | ZIP File |
| File J | 72 | Date J | Spreadsheet |
| ◯ File K | 91 | Date K | Text |
| File L | 55 | Date L | Text |

FILE SYSTEM INTEGRATION AND SYNCHRONIZATION BETWEEN CLIENT AND SERVER

FIELD

Embodiments relate to accessing data stored on remote data server using a hosted application.

BACKGROUND

With the creation of the world-wide-web and high speed computer networks, the paradigm for personal computer usage has shifted. In the past, users would primarily use their personal computers to run programs, and store and manipulate data that was located on their local hard-drive. More recently, users have stored or manipulated data located on a networked drive, or run a program that was provided as a network service, and even then, the programs and data were usually restricted to a local area network. Today, more and more users are storing more and more data on remote data servers, and using remotely provided web-based applications (e.g., SaaS or Software as a Service programs) to manipulate and organize that data. For example, many users today store their personal email and contact information, and even pictures, videos, and music archives on remote servers, and access that data using third party applications that are provided through and controlled by an internet enabled/delivered application (e.g., a web-browser or a music application).

Further, more and more users store data on one remote server or cloud computing system and use web-based applications associated with another remote server or cloud computing system. These disparate systems can be exclusive (or operate without interaction) causing inconvenience for the user when the user attempts to access data using a web-based application.

SUMMARY

In one example embodiment, a non-transitory computer-readable storage medium having stored thereon computer executable program code which, when executed on a computer system, causes the computer system to perform a number of steps. The steps include receiving, at an application server, metadata representing at least one file system stored on a file storage system based on an application executing on the application server, preventing, at the application server, files associated with the file storage system from being downloaded to the application server, monitoring, by the application server, a request to open a file associated with the file storage system, determining the requested file is stored on the file storage system separate from the application server, and triggering, by the application server, a download of the requested file.

These and other aspects can include one or more of the following features. For example, the steps may further include generating an open file window, at the application server, including a file listing based on the metadata, displaying the open file window to a client device associated with the application, and receiving, at the application server, a selection of a file associated with the open file window as the requested file. The steps may further include storing, at the application server, at least one of the files associated with the file storage system, determining, by the application server, if one of the at least one of the files associated with the file storage system has change, and if one of the at least one of the files associated with the file storage system has change, synchronizing the changes with the corresponding file on the file storage system.

For example, the steps may further include receiving, at the application server, a request to launch an application, generating, by the application server, a virtual machine in response the request, and launching, by the virtual machine, the application, wherein the virtual machine includes an associated memory allocated to store the metadata and a cache to store files associated with the metadata. For example, the triggering of a download of the requested file may include communicating, by the application server to the file storage system, a request to download the requested file, and receiving, at the application server, at least a portion of the requested file in response to the request.

For example, the steps may further include storing an indication of a change to a file stored on the application server, storing changes to the file stored on the application server, and communicating at least one of the indication and the changes to the file to the file storage system. For example, the metadata describes a file structure and includes information about the files associated with the file structure. The metadata includes a position in a file structure, a file size, a file name and a file type. The metadata is stored in association with an application operating on the application server.

For example, the steps may further include receiving, at the application server, at least a portion of the requested file, storing the requested file in association with the application, closing, at the application server, the application in response a communication from a client device, and deleting the requested file, at the application server, after the file has been synchronized on the file storage system, in response to the closing of the application.

In another example embodiment, an application server includes a file manager module, the file manager module configured to receive metadata representing at least one file system stored on a file storage system based on an application executing on the application server, and an application configured to generate an open file window including a file listing based on the metadata, display the open file window to a client device associated with the application, and receive, at the application server, a selection of a file associated with the metadata as a selected file.

These and other aspects can include one or more of the following features. For example, the file manager module may be further configured to prevent files associated with the file storage system from being downloaded to the application server, determine if an open file request is associated with the file storage system, determine the requested file is stored on the file storage system separate from the application server, and trigger a download of the requested file. For example, the file manager module may be further configured to store, at the application server, at least one of the files associated with the file storage system, determine if one of the at least one of the files associated with the file storage system has change, and if one of the at least one of the files associated with the file storage system has change, synchronizing the changes with the corresponding file on the file storage system.

For example, the file manager module may be further configured to communicate a request for the selected file to the file storage system and receive at least a portion of the selected file in response to the request. The file manager module may be further configured to store an indication of a change to the selected file, store changes to the file, and communicate at least one of the indication and the changes to the file to the file storage system. For example, the metadata describes a file structure and includes information about the files associated with the file structure.

For example, the application server may be further configured to receive a request to launch an application, the application server may further include a virtual machine manager configured to generate a virtual machine in response the request and launch the application, wherein the virtual machine includes an associated memory allocated to store the metadata and a cache to store files associated with the metadata.

In another example embodiment, a method includes receiving, at a first cloud based system from a second cloud based system, metadata representing at least one file system stored on the a second cloud based system, generating, at the first cloud based system, in response to a communication from a client device operating an application executing on the first cloud based system, an open file window based on the metadata, and selecting a file associated with the at least one file system using the open file window.

These and other aspects can include one or more of the following features. For example, the steps may further include preventing files associated with the second cloud based system from being downloaded to the first cloud based system, determining if an open file request is associated with the second cloud based system, determining the requested file is stored on the second cloud based system separate from the first cloud based system, and triggering a download of the requested file. For example, the steps may further include storing at least one of the files associated with the second cloud based system, determining if one of the at least one of the files associated with the second cloud based system has change, and if one of the at least one of the files associated with the second cloud based system has change, synchronizing the changes with the corresponding file on the file storage system.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Figure 1:
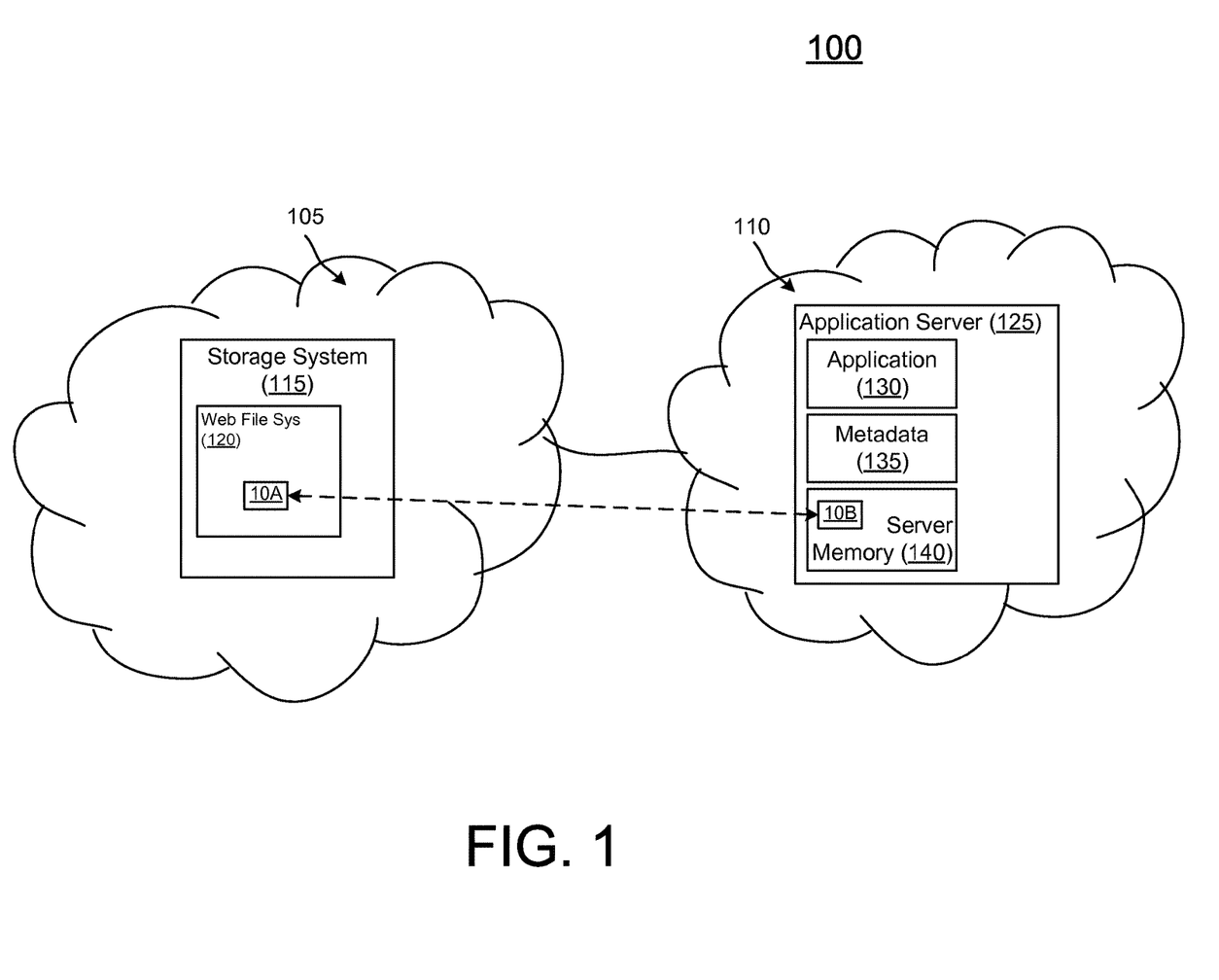
FIG. 1 is a block diagram that illustrates a cloud computing environment according to at least one example embodiment.

FIG. 1 is a block diagram that illustrates a cloud computing environment 100 according to at least one example embodiment. As shown in FIG. 1, an application server 125 in a first cloud network system 110 may be configured to receive metadata 135 representing at least one file system (e.g., web file system 120) stored on a file storage system 115 in a second cloud network system 105 based on an application 130 executing on the application server 125. The application 130 may be configured to generate an open file window including a file listing based on the metadata 135, display the open file window to on a client device (e.g., computing device 205, 225 shown in FIG. 2) associated with the application 130, and receive a selection of a file (e.g., file 10A) associated with the metadata 135.

The application server 125 may be further configured to download, at least, a portion of the file (e.g., file 10A) to a server memory 140 such that the file (e.g., shown as file 10B) can be opened (read, manipulated, changed, and/or the like) by the application 130. Application 130 may be an application associated with a software as a service (SaaS) implemented in a cloud computing environment. For example, application 130 may be a word processing application delivered, via the internet, to a user of a client device (e.g., on a fee for use bases). In this case, application 130 could be executed on a server, on the client device or both.

Figure 2:
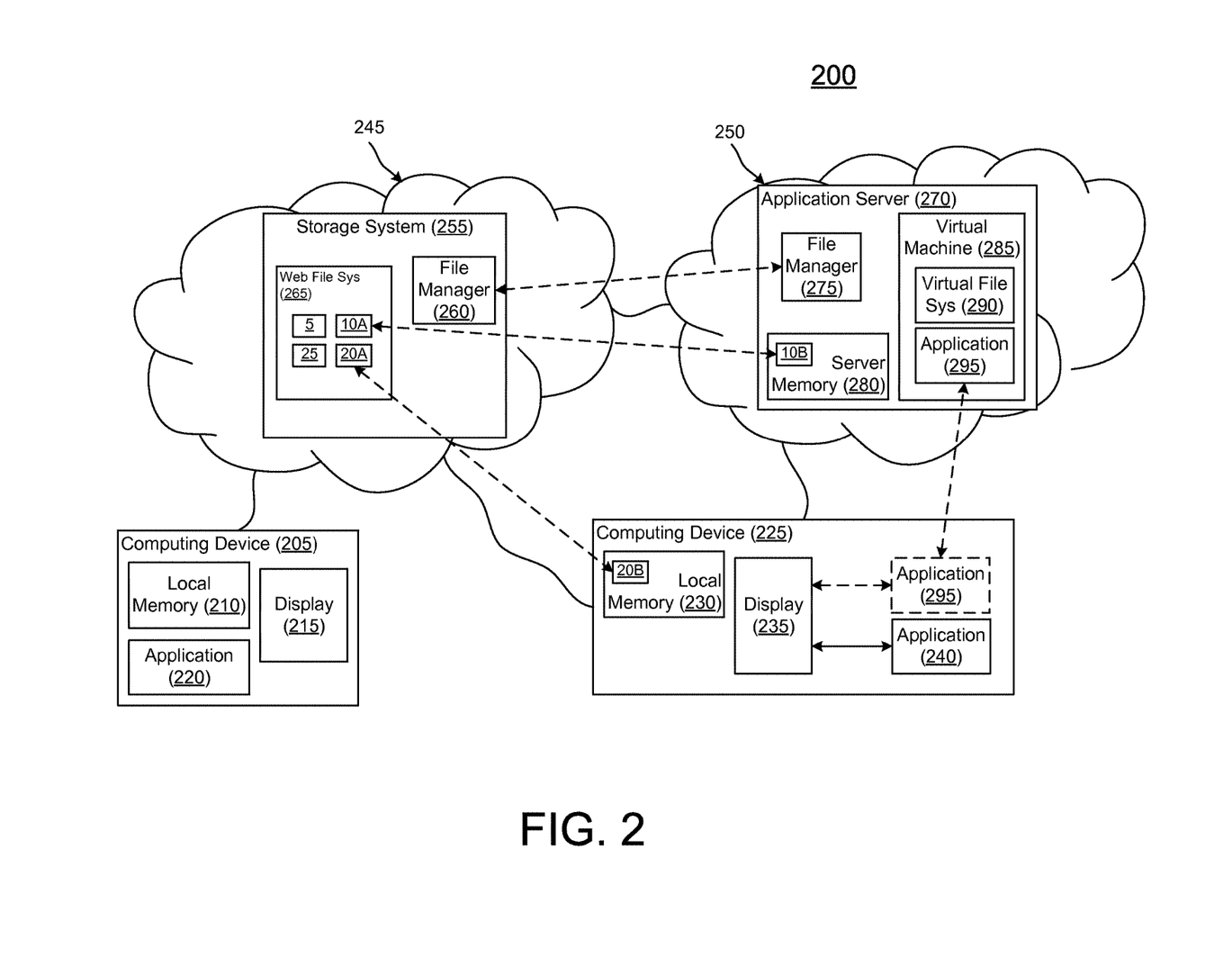
FIG. 2 is a block diagram that illustrates computing devices configured to access files from a cloud-based storage system operating within a cloud computing environment according to at least one example embodiment.

FIG. 2 is a block diagram that illustrates computing devices configured to access files from a cloud-based storage system operating within a cloud computing environment. As shown in FIG. 2, a cloud computing environment 200 includes computing devices 205, 225 and cloud network systems 245, 250. The computing devices 205, 225 and the cloud network systems 245, 250 may be communicatively coupled using at least one internet (and/or, alternatively, intranet) communication standard.

As shown in FIG. 2, computing devices 205, 225 may be configured to access files from a storage system 255 operating within cloud network system 245. Because the storage system 255 is operating in the cloud computing environment 200 and the cloud network system 245, the storage system 255 can, in some implementations, be referred to as a cloud-based storage system, a file hosting service and/or a remote data storage resource. Also, the storage system 255 can be a remote (e.g., non-local) storage system that is remotely access by the computing devices 205, 225.

The computing devices 205, 225 can be any type of device configured to access elements of the cloud network systems 245, 250 (e.g., storage system 255 and/or the application server 270) operating within the cloud computing environment 200. In some implementations, the computing devices 205, 225 can each be, for example, a wired device and/or a wireless device (e.g., Wi-Fi enabled device) and can be, for example, a computing entity (e.g., a personal computing device), a server device (e.g., a web server), a mobile phone, a touchscreen device, a personal digital assistant (PDA), a laptop, a television including, or associated with, at least one processor, a tablet device, e-reader, and/or so forth. The computing device(s) can be configured to operate based on at least one platform (e.g., at least one similar or different platform) that can include at least one type of hardware, software, firmware, operating systems, runtime libraries, and/or so forth.

In some implementations, the computing devices 205, 225 can have relatively few computing resources (e.g., processing resources, storage resources) compared with other systems within the cloud computing environment 200. Accordingly, the computing devices 205, 225 and cloud network systems 245, 250 can be collectively configured so that the computing devices 205, 225 can leverage the computing resources of the cloud network systems 245, 250. Specifically, the storage system 255 of the cloud network system 245 and the computing devices 205, 225 can be configured so that the storage system 255 operates as a primary storage system for the computing devices 205, 225. As shown in FIG. 2, the computing device 205 and the computing device 225, respectively, include a local memory 210 and a local memory 230. Even though the computing devices 205, 225 include local memories 210, 230, the local memories 210, 230 may be configured to operate as a cache of (e.g., a temporary cache, a temporary storage location to) the storage system 255. Accordingly, the local memories 210, 230 can function as a secondary storage to the primary storage of the storage system 255. In some embodiments, for example, a portion of a storage capacity of the storage system 255 allocated to (e.g., designated for use by) the computing device 205 can be more than 10 times greater (e.g., 100 times greater, 1000 times greater) than a storage capacity of the local memory 210 of the computing device 205.

Even though the local memories 210, 230 of the respective computing devices 205, 225 may function as a cache (or secondary storage) to the storage system 255, the files that are stored in at least one local memory 210, 230 and in the storage system 255 can be handled as a unitary or singular set of files. In other words, at least one local memory 210, 230, and the storage system 255 can function as a unitary storage system (e.g., a single virtual storage system, a single virtual hard drive). For example, files stored in at least one local memory 210, 230 and stored in the storage system 255 can be presented to a user (e.g., presented to a user via a user interface) accessing the files in such a way that the storage locations may not be readily distinguished as indicated by files 20A and 20B. Accordingly, whether a user accesses files via the computing device 205 or the computing device 225, a file listing associated with files (e.g., files 20A and 20B) stored in at least one local memory 210, 230, and the storage system 255 may be the same (or substantially the same).

As shown in FIG. 2, the storage system 255 is configured to store files 5, 10A, 15, 20A, organized in a web file system 165 (or directory), that can be designated into at least one category including hosted files, client files, remote source files, and so forth. In this implementation, most of the files 5, 10A, 15, 20A are labeled based on the category with which each of the files 5, 10A, 15, 20A is associated. Accordingly, the files 5, 10A, 15, 20A include at least one hosted file (e.g., files 5, 10A, 15) (also can be referred to as a web file) and a client file 20A. In some implementations, each of the files 5, 10A, 15, 20A can be various types of files such as, for example, a text-based file (e.g., a document file), a spreadsheet file, an image file (e.g., a joint photographic experts group (JPEG) file), a video file (e.g., a moving picture experts group (MPEG) file), a music file (e.g., an MPEG audio layer III (MP3) file), and so forth.

A web file (e.g., files 5, 10A, 15) can be a file created using a web application (e.g., application 295) such as that shown in FIG. 2. The web application can be any type of application that can be, for example, hosted within the cloud network system 250. In some implementations, the web application can be a hosted application. In some implementations, web application can be remotely controlled as it operates within the cloud computing environment 200 by at least one computing device 205, 225.

The client file 20A can be a file that is stored in the storage system 255 from at least one computing device 205, 225. For example, the client file 20A can be a file that is stored in the storage system 255 from at least one computing device 205, 225. For example, the client file 20A can be a file produced using an application 240 operating at the computing device 225. The application 240 can be a local application installed at and operating at the computing device 205, 225.

A remote source file can be a file that is stored in the storage system 255 from a remote source that operates outside of the cloud computing environment 200 (e.g., independent from the cloud computing environment 200 and from the computing devices 205, 225).

As shown in FIG. 2, at least a portion of the files 5, 10A, 15, 20A can be at least temporarily be stored (e.g., cached) in the local memory 230 of the computing device 225. Specifically, file 20B can be a portion (a significant portion or all) of file 20A which is stored in local memory 230 of the computing device 225. The file 20B can be a shadowed, mirrored, or synchronized copy of any of the files stored in the storage system 255 (e.g., file 20A). For example, the file 20B can be a shadowed or mirrored copy of the file 20A stored in the storage system 255. In some implementations, the file 20B can be a file that is stored (e.g., stored temporarily) in the local memory 230 so that the file 20B can be readily accessed (e.g., manipulated) at computing device 225. Although not shown in FIG. 2, at least a portion of the files 5, 10A, 15, 20A can be at least temporarily stored in the local memory 210 of the computing device 205.

The storage system 255 includes a file manager 260. In some implementations, the file manager 260 can function as a web application. In some implementations, the file manager can be incorporated into (e.g., operated in the context of) the web file system 265. The file manager 260 may be configured to provide a user interface through which the computing devices 205, 225 can access the files 5, 10A, 15, 20A stored in the storage system 255 and/or at least one computing device 205, 225. In some implementations, the user interface provided by the file manager 260 can include a file system user interface. In some implementations, the user interface provided by the file manager 260 can represent a listing of the files 5, 10A, 15, 20A (e.g., hierarchy, folder system, enumeration, record, inventory), metadata representing the listing of the files 5, 10A, 15, 20B, and/or other metadata about the files 5, 10A, 15, 20A (e.g., owner, creation date, filename, file availability/state). The listing of the files 5, 10A, 15, 20A can include references to (e.g., pointers to, indicators of) at least one file 5, 10A, 15, 20A. Accessing the files 5, 10A, 15, 20A can include viewing, deleting, editing, downloading, uploading, and/or so forth.

For example, a web file (e.g., files 5, 10A, 15) can be produced and stored in the storage system 255 using a web application (e.g., application 295) in response to input from the computing device 225. The web file (or an identifier thereof) can later be viewed in a user interface provided by the file manager 260 at a display 215 of the computing device 205. The web file can be selected and edited using the computing device 205 via the web application.

The files 5, 10A, 15, 20A can be associated with a user account so that a listing of the files 5, 10A, 15, 20A provided within a user interface by the file manager 260 to the computing device 205, the computing device 225 or the application server 270 (e.g., via computing device 225) may be the same whether a user logs in to the computing device 205 or the computing device 225. In other words, the listing of the files 5, 10A, 15, 20A can be synchronized regardless of the computing device or server through which the listing of the files 5, 10A, 15, 20A is accessed. The listing of the files 5, 10A, 15, 20A provided within the user interface by the file manager 260 can be the same (e.g., synchronized, dynamically synchronized) even though a variety of categories of files can be included in the files 5, 10A, 15, 20A such as files categorized as a web application files, client files provided from a computing device, or files associated with a remote source. The listing of the files 5, 10A, 15, 20A provided within the user interface by the file manager 260 can be the same even though the files 5, 10A, 15, 20A can be distributed between the storage system 255 and/or the computing devices 205, 225. In some implementations, the listing of the files 5, 10A, 15, 20A can be the enumeration of which files are included in the files 5, 10A, 15, 20A.

For example, in some implementations, a user can log in to the computing device 205 and can access and/or manipulate at least one file 5, 10A, 15, 20A. After the user logs out of the computing device 205, the user can later log in to the computing device 225 to access and manipulate at least one file 5, 10A, 15, 20A. When the user logs in to the computing device 225, the listing of the files 5, 10A, 15, 20A after the first login (using the computing device 205) can be presented to the user via the computing device 225 or the application server 270 (via computing device 225). Accordingly, the listing of the files 5, 10A, 15, 20A can be seamlessly maintained (or synchronized) regardless of the computing device through which the user accesses files 5, 10A, 15, 20A. Thus, the file manager 260 can be configured to provide the same (or synchronized) listing of the files 5, 10A, 15, 20A whether the user logs into the computing device 205, the computing device 225 and/or the application server 270 (via computing device 225). In some implementations, even though the listing of the files 5, 10A, 15, 20A can be maintained between the computing devices 205, 225, in some implementations the state of at least one file 5, 10A, 15, 20A can change.

In some implementations, the file 20A can be a file that is downloaded to (e.g., fetched for) the computing device 225 for use at the computing device 225 by a user (if not already available in the local memory 230 of the computing device 225) and stored on the computing device 225 as file 20B. In some implementations, a current version of a file (e.g., file 20B) may already be available in the local memory 230 of the computing device 225, and would not be downloaded from the storage system 255. In some implementations, before a file is downloaded from the storage system 255, the local memory 230 may be audited to determine whether or not the file is already cached in the local memory 230.

In some implementations, the file 20B can be downloaded into the local memory 230 on-demand by a user (e.g., in response to an instruction triggered by the user) of the computing device 225. In some implementations, the file 20B, is stored in the local memory 230 can be available for offline access at the computing device 225. The computing device 225 may not have access to any network or a network where the storage system 255 can be accessed when offline. For example, a user of the computing device 225 can request access to the remote source file 20A stored in the storage system 255. In response to the requests, a copy of the remote storage file 20A can be downloaded to the local memory 230 of the computing device 225 as file 20B. The file 20B can be used (e.g., edited, manipulated, access) by the user at the computing device 225. In some implementations, any changes to the file 20B can be mirrored in (e.g., synchronized within) the remote source file 20A stored in the storage system 255.

In some implementations, the file 20B can be fetched (e.g., pre-fetched) and downloaded to the computing device 225 for use without being explicitly requested by a user of the computing device 225. In other words, at least one file can be automatically cached at the computing device 225 for use by a user. For example, when a user logs in to the computing device 225, the file 20B can be automatically downloaded to the local memory 230 of the computing device 225. In some implementations, the file can be automatically downloaded based on at least one criteria. The criteria can be related to a prediction as to whether or not the file 20B may be accessed by the user of the computing device 225. In some implementations, the criteria can include a criteria related to recent accessing of the file 20B, relationship of the file to other recently accessed files 20B, file categories and/or file types typically accessed by the user, and/or so forth.

In some implementations, the file 20B can be removed from (e.g., deleted from, temporarily removed from, flushed from) the local memory 230 of the computing device 225. In some implementations, the file 20B can be removed from the local memory 230 of the computing device 225 based on at least one criteria including, for example, datetime stamp of the file 20B, size of the file 20B, and/or so forth. In some implementations, the file 20B can be removed from the local memory 230 of the computing device 225 in response to resources of the local memory 225 of the computing device 225 (or other components of the computing device 225) being re-allocated for other operations of the computing device 225. In some implementations, the file 20B can be removed from the local memory 225 the computing device 225 in conjunction with other files that may be stored in the local memory 225.

Although not shown in FIG. 2, in some implementations, at least one file 5, 10A, 15, 20B can be directly processed by an application 240 of at least one computing device 205, 225 without being cached at the computing devices 205, 225. In other words, caching of at least one file 5, 10A, 15, 20A can be bypassed when processing is performed using at least one computing device 205, 225. For example, processing of the file 10A and/or a portion thereof can be handled by the web application (e.g., application 295) operating within the cloud computing environment 200 and/or using the application 240 at the computing device 225. In such implementations, explicit caching of the file 10A in the local memory 230 of the computing device 225 may be bypassed. In some implementations, only a portion of the file 10A may be stored in a temporary memory location within the computing device 225 separate from the local memory 230.

In some implementations, the local memories 210, 230 can be any type of memory such as a random-access memory, a disk drive memory (e.g., a solid-state drive (SSD)), flash memory, and/or so forth. In some implementations, the local memories 210, 230 can be relatively long-term storage memory compared with other memory included in the computing devices 205, 225. In some implementations, the local memories 210, 230 can be the longest-term memory components included in the computing devices 205, 225. In some implementations, the local memories 210, 230 can be separate from cache memory associated with a processor and separate from RAM type memory. In some implementations, the local memories 210, 230 can be implemented as more than one memory component (e.g., more than one random-access memory (RAM) component or disk drive memory) associated with the components of the computing devices 205, 225.

In some implementations, the web application (e.g., application 295) can be configured to be executed or interpreted by a web browser (not shown). This can be contrasted with a native application that can include machine executable code and can be configured to be executed directly by a processor or via an operating system of a computing device, whereas, the web application may, in some implementation, be incapable of execution or display without the aid of the web browser. Thus, the web application can be operated inside (e.g., executed from within) a browser with a dedicated user interface, and typically provide functionality and an experience that is more rich and interactive than a standalone website but are less cumbersome and monolithic than a desktop application. A web browser can be executed by a computing device (e.g., the computing devices 205, 225) can receive code (e.g., HTML code, Javascript) from a remote server (e.g., a remote server that hosts a website) and can execute the received code on the computing device for the benefit of a user of the computing device. Examples of web applications can include games, photo editors, and video players that are executed within the browser.

In some implementations, the web application (e.g., application 295) may operate or be executed within the context of a browser process. In other words, the web application appears as a window on a desktop (or other main or home page) while executing as a browser process. In this implementation, some or all indications that a browser process (or window) is executing are removed from the web application window. For example, although a browser process may be executing, there may be no address bar, no bookmarks, no back/forward buttons, no tabs, no browser chrome or appearance, and the like. Accordingly, the web application may be executed (or rendered) using web-based protocols (e.g., video streaming, page rendering, and the like). Therefore, the web application can appear to the user of the client device (e.g., be shown on the display) as a freestanding application including having its own icon.

In some implementations the web application (e.g., application 295) can be a hosted application or a packaged application. Hosted applications may include at least a portion of a web site that itself includes web pages, plus some metadata that may be especially pertinent to the web application or to the user of the web application to allow the web application to perform some particular functionality for the user. Such metadata may include, for example, a name of the application, a description of the application, a version of the application, and any URLs that the application uses, including the launch page for the application (i.e., the web page that a browser goes to when a user clicks the hosted application's icon). The metadata may be contained in a manifest file (e.g., a .crx file) hosted on a server of a developer or a server of a digital marketplace.

Packaged applications can be considered web applications whose code is bundled, so that the user can download at least a portion of the content of a web application for execution by the browser. A packaged web application may not be dependent on network access to perform its functionality for the user, and rather may be executed successfully by the browser locally on the computing device without access to a network. Packaged web applications have the option of using Extension APIs, allowing packaged applications to change the way the browser behaves or looks.

More and more computing devices operate as client devices with minimal local resources (e.g., a limited or small amount of memory and/or processing capacity) that rely on networked or cloud computing devices to store data and provide software. Accordingly, application 295 can be a web application and/or a hosted application configured to provide a service to a computing device 225 as a client device. As such, application 295 may be configured to access data stored on storage system 255 that is associated with computing device 225 (or a user of the computing device 225).

In an example implementation, the application 295 may be executed within a virtual machine 285 operating on the application server 270. In other words, the application server 270 may be configured to generate at least one virtual machine 285, each virtual machine 285 may be configured to execute at least one application 295. In an example implementation a user initiates a launching of the application 295 via computing device 225. Launching of the application 295 may initiate generation of the virtual machine 285. In some implementations the virtual machine 285 may be associated with the computing device 225 (or a user of the computing device 225). In such an implementation, more than one application 295 may operate within the virtual machine 285 each application 295 associated with the computing device 225 (or a user of the computing device 225).

Upon launching of the application 295 by the application server 270, metadata representing web file system 265 (as stored on the file storage system 255) may be communicated from the storage system 255 to the application server 270. For example, as shown in FIG. 2, the storage system 255 includes a file manager 260 and the application server 270 includes a file manager 275. Upon launching of the application 295 the file manager 275 may request the metadata from the file manager 260. In response to the request, the file manager 260 may generate the metadata based on the contents of the web file system 265. The web file system 265 may include file structures associated with a plurality of users. Therefore, the request may include user credentials (e.g., username/password, security key(s), and/or the like). As a result, the metadata may represent a file structure associated with the user of computing device 225. Accordingly, the file manager 275 may be configured to manage files based on users or user accounts and/or based on an associated virtual machine.

Upon receiving the metadata, the file manager 275 may store the metadata in (or as) the virtual file system 290. In other words, the virtual file system 290 may mirror the web file system 265 (absent the actual data of the files 5, 10A, 15, 20A) based on the metadata. Accordingly, the metadata may include information or data associated with file or folder relationships. For example, the metadata may include information indicating files within a folder and relationships between folders and subfolders. The metadata may include information or data associated with files. For example, metadata may include information indicating a file name, a file type, a file size, a date created (edited, last opened, and/or the like). In other words, the metadata may include any information useful in creating a file structure and to provide information about each file.

In an alternative example, the file manager 275 may be an element of the virtual machine 285. In other words, each virtual machine 285 operating on the application server 270 may have an associated file manager 275. According to example embodiments, the files associated with the metadata remain on the storage system 255. In other words, the file manager 260 and the file manager 275 do not coordinate to transfer (or copy) the files 5, 10A, 15, 20A onto the application server 270 until (or unless) a file is needed (e.g., opened, read, and/or the like) by the application 295.

In an example implementation, the application server includes a server memory 280. The server memory 280 may be a global memory (e.g., one memory associated with all of the virtual machine(s) 285 operating on the application server) or a local memory (e.g., one associated memory per virtual machine 285 operating on the application server). In the local memory case, a larger memory may be portioned and allocated to each virtual machine 285.

Upon receiving an indication that a file associated with the metadata is to be opened by the application 295, the file manager 275 request the file from the storage system 255 via file manager 260. For example, in one example implementation, the indication that a file associated with the metadata is to be opened may be received from a file/open operation associated with the application 295. In another example implementation, a folder may be viewed and a file selected via the folder (e.g., right click file and select open with) which results opening the file and an application 295 simultaneously (or substantially simultaneously). In the first example, the application 295 may display an open with user interface or window as shown below in FIG. 4. In the second example the folder may be viewed as a user interface or window as shown below in FIG. 4.

As an example, in either example implementation, file 10A may be selected by a user. Upon receiving the indication that file 10A has been selected, the file manager 275 may request file 10A from the storage system 255 via file manager 260. Then, file manager 260 transmits a copy (or a portion of a copy) of file 10A to the application server 270 via the file manager 275. The copy (or the portion of the copy) of file 10A is then stored in the server memory 280 as file 10B. Accordingly, the file 10A can be downloaded into the server memory 280 on-demand by a user (e.g., in response to a file open instruction triggered by the user) of the application server 270 via, for example, application 295. The file 10B can be a shadowed, mirrored, or synchronized copy of any of the files stored in the storage system 255 (e.g., file 10A). For example, the file 10B can be a shadowed or mirrored copy of the file 10A stored in the storage system 255. In some implementations, the file 10B can be a file that is stored (e.g., stored temporarily) in the server memory 280 so that the file 10B can be readily accessed (e.g., manipulated) at the application server 270 (e.g., by application 295).

In some implementations, a current version of a file (e.g., file 10B) may already be available in the server memory 280 (e.g., because of a previous opening of the file) of the application server 270, and would not be downloaded from the storage system 255. In some implementations, before a file is downloaded from the storage system 255, the server memory 280 may be audited to determine whether or not the file is already cached in the server memory 280.

In some implementations, the file 10B can be removed from (e.g., deleted from, temporarily removed from, flushed from) the server memory 280 of the application server 270.

In some implementations, the file 10B can be removed from the server memory 280 of the application server 270 if the application 295 is closed. In some implementations, the file 10B can be removed from the server memory 280 of the application server 270 if the virtual machine 285 is terminated. In some implementations, the file 10B can be removed from the server memory 280 of the application server 270 if the user logs off of computing device 225.

The cloud computing environment 200 can include a variety of hardware and/or software components including servers (e.g., application servers), databases, and so forth. The components of the cloud computing environment 200 can be integrated into a computing infrastructure configured to share (e.g., dynamically allocate) resources and/or service a variety of endpoints including the computing devices 205, 225.

Figure 3:
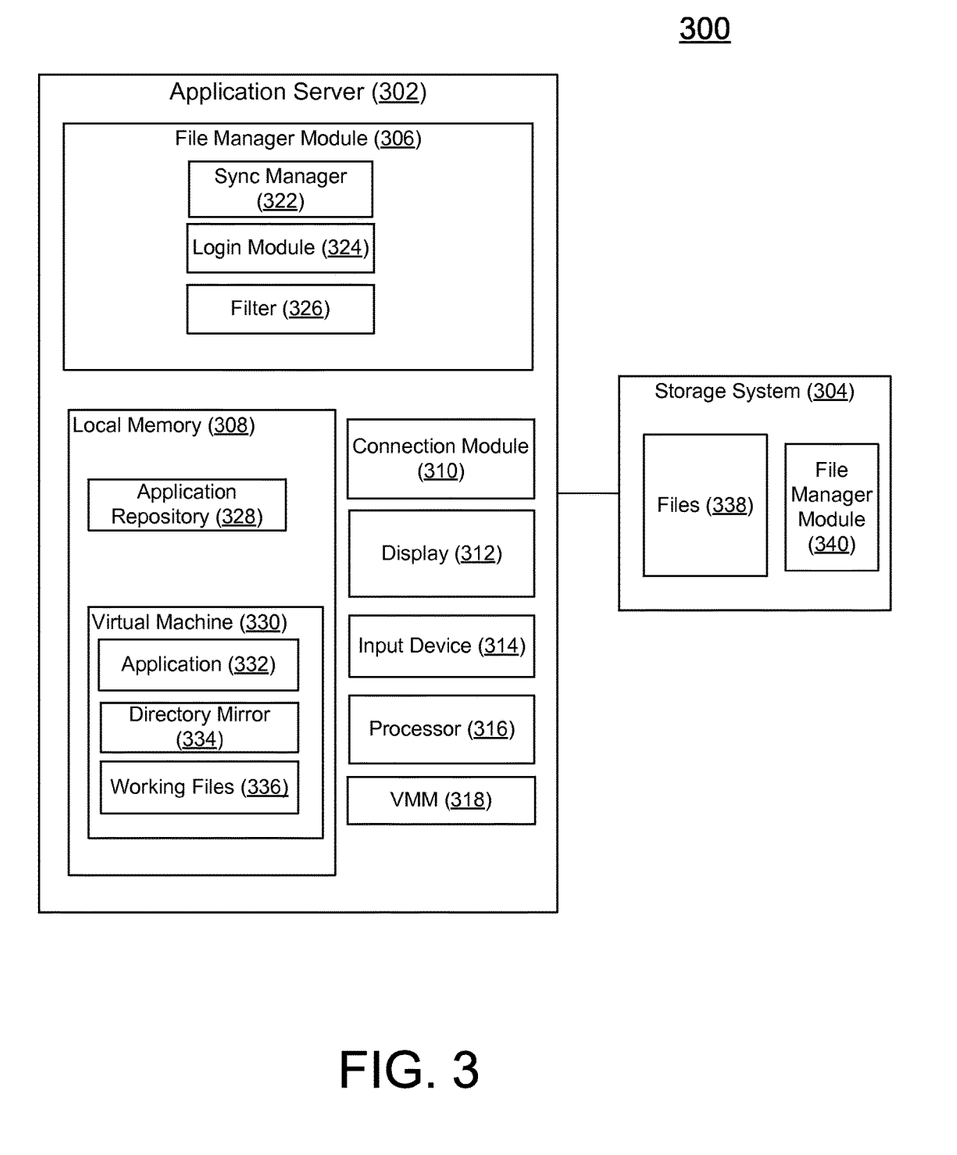
FIG. 3 is a block diagram that illustrates an application server and a storage system according to at least one example embodiment.

FIG. 3 is a block diagram of a system 300 that illustrates an application server 302 and a storage system 304 according to at least one example embodiment. As shown in FIG. 3, the application server 302 includes a file manager module 306, a local memory 308, a connection module 310, a display 312, an input device 314, a processor 316 and a virtual machine manager (VMM) 318. The file manager module 306 includes a sync manager 322, a login manager 324 and a filter 326. The local memory 308 includes an application repository and a virtual machine 330. The virtual machine includes an application 332, a directory mirror 334 and working files 336. The storage system 304 includes files 338 and a file manager module 340.

The application server 302 may be configured to establish at least a portion of a communication link (e.g., a unidirectional communication link, a bidirectional communication link) with the storage system 304. Although not shown in FIG. 3, the application server 302 and the storage system 304 can be configured to operate within a cloud computing environment(s).

The file manager module 306 can be configured to interact with (e.g., access, trigger operations of) the file manager module 340 of the storage system 304. The file manager module 306 can, in some implementations, be an application configured to operate within a virtual machine (e.g., virtual machine 330). The processor 316 can be associated with any of the components of the application server 302, and can be used for execution of any of the operations of the application server 302. The file manager module 340 of the storage system 304 may be configured to resolve file conflicts. File conflicts may result from two or more devices changing a same file. For example a user associated with computing device 205 may modify file 10A while a user using application 295 modifies file 10A (using file 10B). The file manager module 340 may resolve conflicts (e.g., by storing the new files using different names) when the changed files are synchronized with file 10A.

The file manager module 306 includes a sync manager 322 that can be configured to monitor a state (or a change of a state) of at least one file 338 associated with the storage system 304 as compared to a state of at least one working file 336 associated with the application server 302. In some implementations, one or more of the states can be designated based on a category of the file. In some implementations, one or more of the states can designated based on whether a file has been recently (or is currently) cached or un-cached in the local memory 308 of the application server 302. In some implementations, a state of the file can be designated by default (without an explicit instruction from a computing device). In some implementations, a state of the file can be designated based on metadata associated with the file. In other words, the state of a file can be based on any combination of a category designation, an instructions from a user, by default, how recently a file has been locally cached or whether the file is un-cached (not locally cached), whether or not a file has changed as compared to a corresponding storage system file, if a file is or has been synchronized with a corresponding storage system file, and/or so forth.

The file manager module 306 also includes a login module 324 configured to handle at least one user account associated with the files 338 (e.g., via a user interface of a client device).

The file manager module 306 includes a filter 326 (e.g., as a file system filter driver) that can be configured to limit files requested and/or downloaded from the storage system 304 to the application server 302. The files may be limited to those files currently in use by an application associated with application server 302 (e.g., those stored in application repository 328) and currently executing on the application server 302 (e.g., application 332). For example, when the file manager module 306 (e.g., the sync manager 322) is synchronizing a file system (e.g., web file system 265), the filter 326 may prevent or cause the file manager module 306 to not download the data representing the file. In an example implementation, filter 326 communicates a file transfer complete command to the sync manager 322. This has the effect of causing the file manager module 306 to indicate the data representing a file (or a plurality of files) has been downloaded when the file (or a plurality of files) has not been downloaded.

The filter 326 may also be configured to trigger a download of a file (e.g., file 10A). For example, the filter 326 may determine the file has been opened (e.g., selected to be opened by a user of application 332) that is stored on a file storage system separate from the application server 302 (e.g., not currently stored on the application server 302). The filter 326 may then cause the sync manager 322 to download the file to be opened. The filter 326 may cause a delay in the application 332 as the application 332 attempts to read the file (e.g., because the application 332 has an indication that the file exists on the application server 302 when the file does not exist on the application server 302).

In an example implementation, the filter 326 may communicate a command to the sync manager 322. The command may indicate the file (e.g., file 10A) on the storage system 304 has changed. The indication that the file has changed may trigger the sync manager 322 to download the file and replace (noting that the file is not currently stored on the application server 302) the file on the application server 302 with the downloaded file (e.g., as file 10B). In order to determine the file is not currently stored on the application server 302, the filter 326 may maintain a list of files. The list of files may include a listing of files not stored on the application server 302 or a list of files that are stored on the application server 302. The filter 326 may determine the file is not currently stored on the application server 302 based on the list (e.g., by performing a search of the list).

The application server 302 includes a VMM 318 (or hypervisor) that can be configured to generate and manage a virtual machine (e.g., virtual machine 330). The VMM 318 may be configured to associate an application 332 (e.g., from application repository 328), execute the application 332 within an emulated architecture or platform within the application server 302. The virtual machine 330 (generated by the VMM 318) may be configured to provide a platform-independent environment that abstracts away details of the underlying hardware or operating system, and allows the application 332 to execute in a consistent manner regardless of platform (e.g., hardware and operating system associated with the application server 302). In one example implementation, the at least one file 5, 10A, 15, 20A can be presented through the virtual machine 330 such that the file management occurs within the virtual machine 330 operating on one or more application server or possibly other computing device. The VMM 318 may create the virtual machine 330 when a process associated with the application 332 is started and destroy the virtual machine 330 when process associated with the application 332 is closed.

Destroying the virtual machine 330 when process associated with the application 332 is closed may include at least one operation based on synchronizing a file. For example, a file (e.g., file 10B) may have been changed by application 332. However, the changed file may not have been synchronized to the storage system 304. Accordingly, according to an example implementation, the virtual machine 330 may take at least one step to ensure the file is synchronized. For example, the virtual machine may have a delay (e.g., a preconfigured delay) associated with being destroyed. For example, the virtual machine may delay by 20 (30, 40, 45, and the like) minutes before initiating the destroy process. This delay may allow the sync manager 322 enough time to perform steps associated with synchronization. Alternatively, or in addition to, the virtual machine may cause the file, or changes to the file, (e.g., file 10B) to be stored in a queue associated with the sync manager 322.

The virtual machine 330 includes a directory mirror 334 that can be configured to mirror a directory (e.g., file structure) associated with the files 338 of the storage system 304. The directory mirror 334 may be based on metadata (described above) received from the storage system 304 that describes a file structure and includes information associated with each file in files 338. The directory mirror 334 (and metadata) may be limited to the files or data for an authorized user and/or user of the application 332 based on an authorization performed by the login module 324.

The virtual machine 330 includes a working files 336 that can be configured to store or cache files that are in use or have been used by the application 332. The local memory 308 includes an application repository 328 that can be configured to store applications (as executable code) available to client devices from the application server 302.

The application server 302 includes a client connection module 310 configured to establish at least a portion of a communication link between the application server 302 and the storage system 304. In some implementations, the communication link between the application server 302 and the storage system 304 can be a wireless connection, a wired connection, a peer-to-peer connection, a network connection, a secure connection, an encrypted connection, and/or so forth.

The application server 302 may be implemented in a data center with input where input events are simulated and injected via a client device. However, the application server 302 may also include an input device 314 that can be configured to trigger at least one operation of the application server 302. In some implementations, the input device 314 can be, or can include, for example, a mouse device, a keyboard device, a touchpad device, a microphone, and/or so forth. The application server 302 includes a display 312 that can be any type display such as, for example, a light emitting diode (LED) display, an electrostatic touch device, a resistive touchscreen device, a surface acoustic wave (SAW) device, a capacitive touchscreen device, a pressure sensitive device, a surface capacitive device, a projected capacitive touch (PCT) device, and/or so forth. If the display 312 is a touch sensitive device, the display 312 can function as an input device. For example, the display 312 can be configured to display a virtual keyboard (e.g., emulate a keyboard) that can be used by a user as an input device.

The components (e.g., modules, processors) of the application server 302 and/or the storage system 304 can be configured to operate based on at least one platform (e.g., at least one similar or different platform) that can include at least one type of hardware, software, firmware, operating systems, runtime libraries, and/or so forth. In some implementations, the components of the application server 302 and/or the storage system 304 can be configured to operate within a cluster of devices (e.g., a server farm). In such an implementation, the functionality and processing of the components of the application server 302 and/or the storage system 304 can be distributed to several devices of the cluster of devices.

The components of the application server 302 and/or the components of the storage system 304 can be, or can include, any type of hardware and/or software configured to process attributes. In some implementations, at least one portion of the components shown in the components of the application server 302 and/or the components of the storage system 304 in FIG. 3 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, at least one portion of the components of the application server 302 and/or the components of the storage system 304 can be, or can include, a software module configured for execution by at least one processor (not shown). In some implementations, the functionality of the components can be included in different modules and/or different components than those shown in FIG. 3.

In some implementations, at least one component of the application server 302 and/or the components of the storage system 304 can be, or can include, processors configured to process instructions stored in a memory (in conjunction with or in addition to those shown). For example, the file manager module 306 (and/or a portion thereof) can be, or can include, a combination of a processor and a memory configured to execute instructions related to a process to implement at least one function.

In some implementations, the storage system 304 can be a remote database, a local database, a distributed database, a relational database, a hierarchical database, and/or so forth. In some implementations, the storage system 304 can be, or can include, a memory shared by multiple devices such as computing device 205. In some implementations, the storage system 304 can be associated with a server device (not shown) within a network and configured to serve the components of the application server 302.

Although not shown, in some implementations, the components of the application server 302 and and/or the components of the storage system 304 can be configured to operate within, for example, a data center (e.g., a cloud computing environment), a computer system, at least one server/host device, and/or so forth. In some implementations, the components of the application server 302 and/or the components of the storage system 304 can be configured to operate within a network. Thus, the components of the application server 302 and/or the components of the storage system 304 can be configured to function within various types of network environments that can include at least one device and/or at least one server device. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include at least one segment and/or can have a portion based on various protocols such as Internet Protocol (IP) and/or a proprietary protocol. The network can include at least a portion of the Internet.

Figure 4:
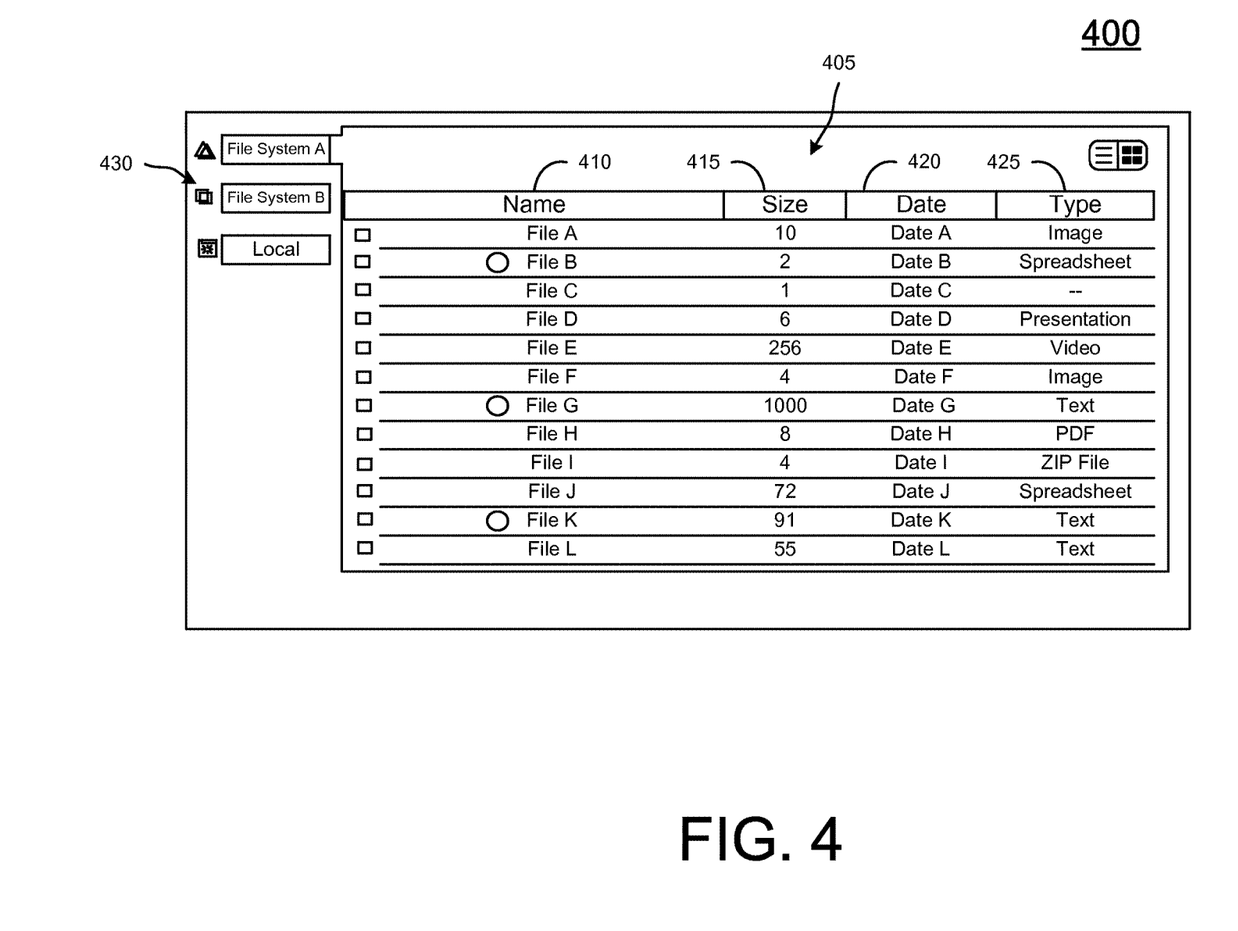
FIG. 4 illustrates a user interface according to at least one example embodiment.

FIG. 4 illustrates a user interface according to at least one example embodiment. The user interface 400 can be provided by a file manager (e.g., file manager module 306). The user interface 400 can be received by (e.g., controlled at) at least one of the computing devices 205, 225 via, for example, application 295. The user interface 400 may be launched (or opened) as the result of an open file action within the application (e.g., application 295, 332). The user interface 400 may be launched (or opened) as the result of a user action to view the files on a drive or remote file directory. In this case, the user interface may be configured to initiate a launch of an application (e.g., application 295, 332).

As shown in FIG. 4, a listing of files 405 is represented within the user interface 400. The listing of files 405 includes files represented by the names (shown in column 410) File A through File L. The listing of files 405 includes a variety of information about each of the files including size (shown in column 415), date (shown in column 420), and type (shown in column 425). The files represented within the listing of files 405 can be designated into categories such as, for example, web files, the client files, remote source files, and/or so forth. When the user interface 400 is opened with an application (e.g., application 295, 332), the type of file may be filtered based on the application. For example, if the application is an image editing application, only file types that are images may be shown in user interface 400.

As shown in FIG. 4, even though the listing of files 405 can include files designated in a variety of categories 430, the files are represented within a single user interface 400 and in a single window labeled "File System A" and "File System B". In some implementations, other types of files, including files stored on a local storage device, downloaded files, and/or so forth, can be listed in the File System window.

Figure 5:
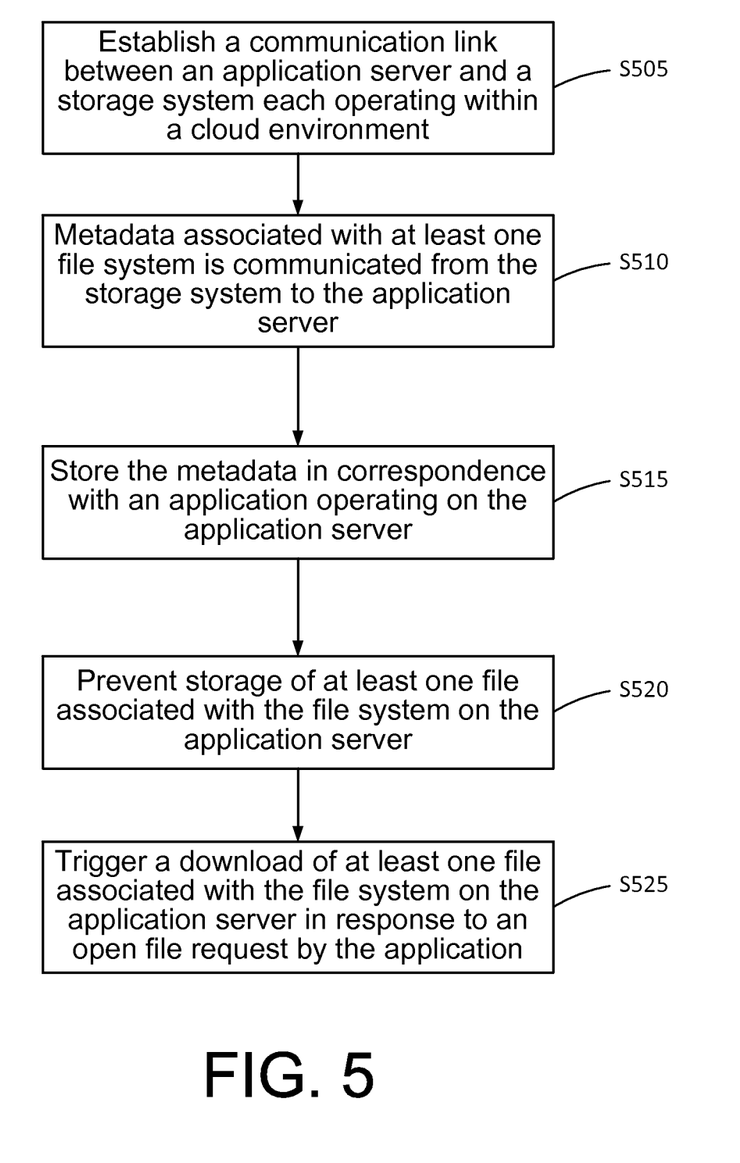
FIGS. 5, 6 and 7 are flowcharts of methods according to example embodiments.
Figure 6:
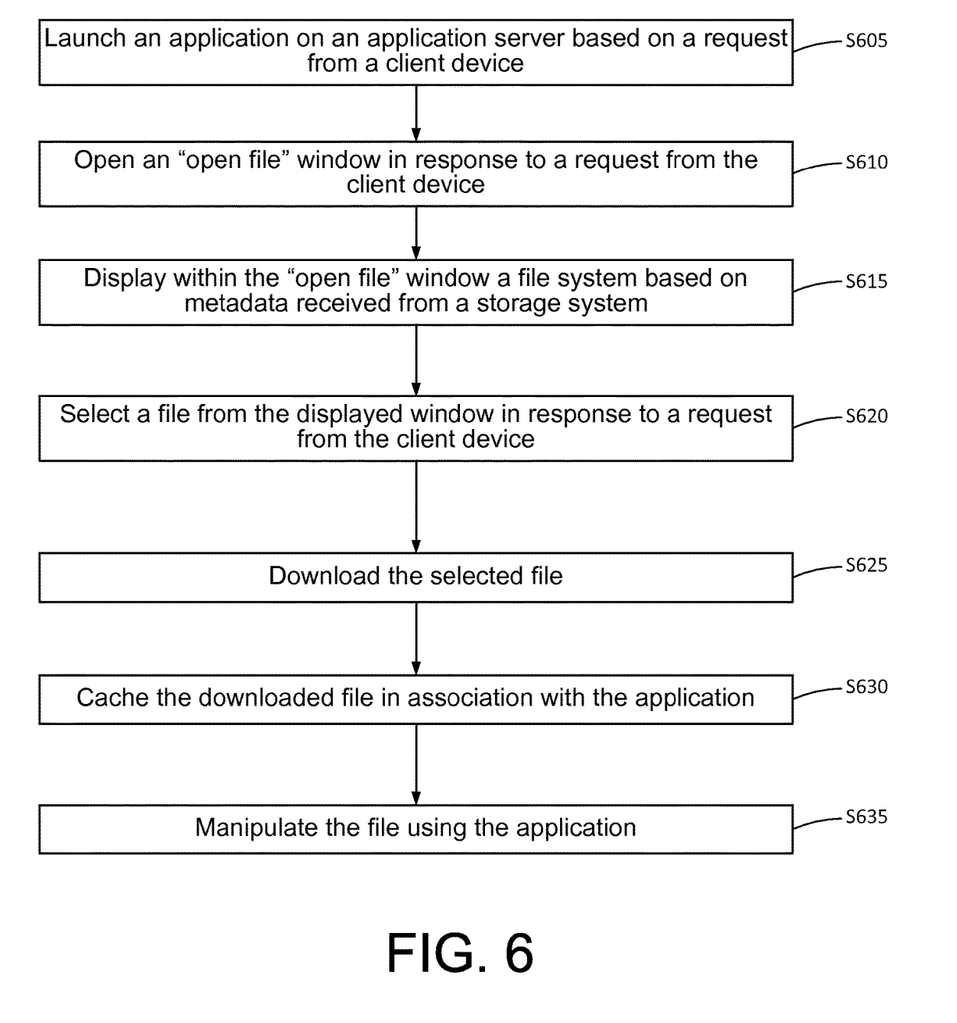
Figure 7:
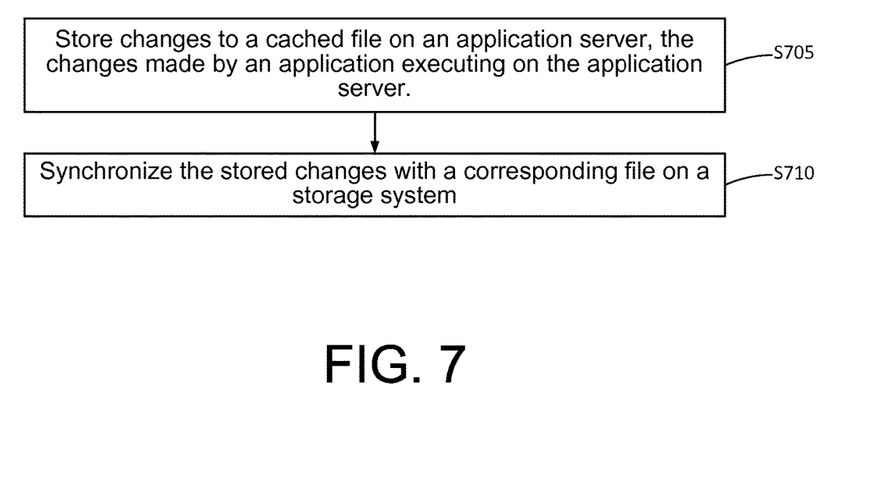

FIGS. 5, 6 and 7 are flowcharts of methods according to example embodiments. The steps described with regard to FIGS. 5-7 may be performed due to the execution of software code stored in a memory (e.g., memory 210, 230, 280 and/or 308) associated with an apparatus (e.g., as shown in FIGS. 1, 2 and 3) and executed by at least one processor (e.g., at least one processor 316) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 5-7.

FIG. 5 is a flowchart of a method according to at least one example embodiment. As shown in FIG. 5, in step S505 a communication link between an application server and a storage system each operating within a cloud environment is established. The cloud environment may include two or more cloud network systems such that the application server and the storage system are in different cloud network systems. The communication link between the application server and the storage system can be a wireless connection, a wired connection, a peer-to-peer connection, a network connection, a secure connection, an encrypted connection, and/or so forth. For example, the connection module 310 may establish the communication link between the application server 302 and the storage system 304 each in a different cloud network system 245, 250.

In step S510 metadata associated with at least one file system is communicated from the storage system to the application server. The file system may be a file system on the storage system for which a user of the application server has access to or authority to use. The file system may include a file structure (e.g., folder/sub-folder associations) and files (e.g., data files). The metadata may describe or include information about the file structure and the files. For example, metadata associated with web file system 265 and files 5, 10A, 20A, 25 may be communicated to application server 270.

In step S515 the metadata is stored in correspondence with an application operating on the application server. The metadata may be stored in a local memory associated with the application server. For example, local memory 308 includes a virtual machine 330 on which an application 332 is executing. The virtual machine 330 also includes a directory mirror 334 (e.g., a portion of memory 308) which corresponds to the application 332. The metadata may be stored in (or as) the directory mirror 334.

In step S520 storage of at least one file associated with the file system on the application server is prevented. For example, the filter 326 may communicate a message to the sync manager 322 that causes the sync manager to not download the at least one file. The message may indicate that the at least one file has already been downloaded.

In step S525 a download of at least one file associated with the file system on the application server is triggered in response to an open file request by the application. For example, the filter 326 may monitor file open requests. If a file open request is for a file stored on the file storage system separate from the application server 302 (e.g., not stored on the application server 302), the filter 326 triggers the sync manager 322 to download the requested file.

FIG. 6 is a flowchart of a method according to at least one example embodiment. As shown in FIG. 6, in step S605 an application is launched on an application server based on a request from a client device. For example, a user may be operating computing device 225 (as a client device) which may be communicatively coupled to application server 270. The user may launch application 295 (e.g., as a hosted or web application) which causes the application server 270 to generate virtual machine 285 and execute application 295 within the virtual machine 285.

In step S610 an "open file" window is opened in response to a request from the client device. For example the user, using computing device 225, selects an open file operation (e.g., file→open→open file) using the application 295. The open file may be a user interface (e.g., user interface 400) associated with the application 295.

In step S615 within the "open file" window, a file system based on metadata received from a storage system is displayed. For example, user interface 400 opens as the "open file" window and is populated based on metadata representing web file system 265 associated with storage system 255. The metadata representing web file system 265 may be read from virtual file system 290.

In step S620 a file is selected from the displayed window in response to a request from the client device. For example the user, using computing device 225, selects (e.g., mouse clicks on) file 10A from the metadata representing web file system 265 as displayed in user interface 400. In step S625 the selected file is downloaded. For example file 10A is downloaded from storage system 255 and in step S630 stored on (e.g., as a cache file) application server 270 (as represented by file 10B). In step S630 the downloaded file is cached in association with the application. In step S635 the file is manipulated (e.g., changed/revised) using the application 295. The file 10B may be changed based on the manipulation using application 295.

FIG. 7 is a flowchart of a method according to at least one example embodiment. As shown in FIG. 7, in step S705 changes to a cached file are stored on an application server, the changes made by an application executing on the application server. For example, application 295 makes changes to file 10B which is a cached (or mirrored) file of file 10B. The changes are stored as file 10B. In step S710 the stored changes are synchronized with a corresponding file on a storage system. For example, file manager 275 receives an indication (e.g., a state change) associated with file 10B. File manager 275 may send the changes to file manager 260 and file manager 260 may make the changes to file 10A. In another example implementation, file manager 275 queues the changes and sends the queued changes to file manager 260. The queued changes may be communicated at regular (e.g., time) intervals or based on an event (e.g., closing the application 295 or file 10B). File manager 260 may then update file 10A based on the received queued changes.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of at least one of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of at least one other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include at least one Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A non-transitory computer-readable storage medium having stored thereon computer executable program code which, when executed on a computer system, causes the computer system to perform steps comprising:
    receiving, at an application server, metadata representing at least one file system stored on a file storage system based on an application executing on the application server;
    triggering, at the application server, a download of files stored on the file storage system that are associated with the metadata;
    after triggering the download of files stored on the file storage system, preventing, at the application server, a plurality of files stored on the file storage system that are not in use by the application from being downloaded to the application server, at least one of the plurality of files stored on the file storage system being configured for manipulation using the application;
    after preventing the plurality of files associated with the file storage system from being downloaded, monitoring, by the application server, a request to open one of the plurality of files prevented from being downloaded to the application server;
    in response to receiving the request to open, by the application executing on the application server, the one of the plurality of files prevented from being downloaded, determining the requested one of the plurality of files prevented from being downloaded is stored on the file storage system separate from the application server; and
    in response to determining the requested one of the plurality of files prevented from being downloaded is stored on the file storage system, triggering, by the application server, a download of the requested one of the plurality of files prevented from being downloaded.

2. The non-transitory computer-readable storage medium of claim 1, wherein the steps further comprise:

generating an open file window, at the application server, including a file listing based on the metadata;

displaying the open file window to a client device associated with the application; and receiving, at the application server, a selection of a file associated with the open file window as the requested one of the plurality of files prevented from being downloaded.

3. The non-transitory computer-readable storage medium of claim 1, wherein the steps further comprise:

storing, at the application server, at least one of the files associated with the file storage system;

determining, by the application server, if one of the at least one of the files associated with the file storage system has changed; and if one of the at least one of the files associated with the file storage system has changed, synchronizing the changes with a corresponding file on the file storage system.

4. The non-transitory computer-readable storage medium of claim 1, wherein the steps further comprise:

receiving, at the application server, a request to launch an application;

generating, by the application server, a virtual machine in response the request; and launching, by the virtual machine, the application, wherein the virtual machine includes an associated memory allocated to store the metadata and a cache to store files associated with the metadata.

5. The non-transitory computer-readable storage medium of claim 1, wherein the triggering of a download of the requested one of the plurality of files prevented from being downloaded includes:

communicating, by the application server to the file storage system, a request to download the requested one of the plurality of files prevented from being downloaded; and receiving, at the application server, at least a portion of the requested one of the plurality of files prevented from being downloaded in response to the request.

6. The non-transitory computer-readable storage medium of claim 1, wherein the steps further comprise:

storing an indication of a change to a file stored on the application server;

storing changes to the file stored on the application server; and communicating at least one of the indication and the changes to the file to the file storage system.

7. The non-transitory computer-readable storage medium of claim 1, wherein the steps further comprise determining at least one of an owner, a creation date, a file name, a file availability and a file state based on the metadata.

8. The non-transitory computer-readable storage medium of claim 1, wherein the steps further comprise determining at least one of a position in the file system, a file size, a file name and a file type based on the metadata.

9. The non-transitory computer-readable storage medium of claim 1, wherein the metadata is stored in association with an application operating on the application server.

10. The non-transitory computer-readable storage medium of claim 1, wherein the steps further comprise:

receiving, at the application server, at least a portion of the requested one of the plurality of files prevented from being downloaded;

storing the requested one of the plurality of files prevented from being downloaded in association with the application;

closing, at the application server, the application in response a communication from a client device; and deleting the requested one of the plurality of files prevented from being downloaded, at the application server, after the file has been synchronized on the file storage system, in response to the closing of the application.

11. An application server comprising:

a processor configured to:

receive, from a file storage system, metadata representing at least one file system stored on the file storage system based on an application being executed by the processor;

store the metadata on the application server;

trigger a download of files stored on the file storage system that are associated with the metadata;

after triggering the download of files stored on the file storage system, prevent a plurality of files associated with the file storage system that are not in use by an application executing on the application server from being downloaded to the application server, at least one of the plurality of files associated with the file storage system being configured for manipulation using the application;

after preventing the plurality of files associated with the file storage system from being downloaded, generate an open file window for display on a client device remote from the application server, the open file window including a file listing based on the metadata stored on the application server;

communicate the open file window from the application server to the client device for display on the client device in association with the application; and receive, at the application server from the client device, a selection to open one of the plurality of files prevented from being downloaded to the application server as a selected file;

determine the selected one of the plurality of files prevented from being downloaded is stored on the file storage system separate from the application server;

in response to determining the selected one of the plurality of files prevented from being downloaded is stored on the file storage system, trigger, by the application server, a download of the requested one of the plurality of files prevented from being downloaded.

12. The application server of claim 11, wherein the processor is further configured to:

store, at the application server, at least one of the files associated with the file storage system;

determine if one of the at least one of the files associated with the file storage system has changed; and if one of the at least one of the files associated with the file storage system has changed, synchronizing the changes with a corresponding file on the file storage system.

13. The application server of claim 11, wherein the processor is further configured to:

communicate a request for the selected file to the file storage system; and receive at least a portion of the selected file in response to the request.

14. The application server of claim 11, wherein the processor is further configured to:

store an indication of a change to the selected file;

store changes to the file; and communicate at least one of the indication and the changes to the file to the file storage system.

15. The application server of claim 11, wherein the processor is further configured to determine at least one of a position in the file system, a file type, a file name, an owner, a creation date, a filename, a file availability and a file state based on the metadata.

16. The application server of claim 11, wherein the application server is configured to receive a request to launch an application, the processor further configured to:
generate a virtual machine in response the request and launch the application, wherein the virtual machine includes an associated memory allocated to store the metadata and a cache to store files associated with the metadata.

17. A method comprising:
receiving, at a first cloud based system from a second cloud based system metadata representing at least one file system stored on the second cloud based system;
storing the metadata on the first cloud based system;
triggering, by the first cloud based system, a download of files stored on the second cloud based system that are associated with the metadata;
after triggering the download of files stored on the second cloud based system, preventing, by the first cloud based system, a plurality of files associated with the second cloud based system that are not in use by an application executing on the first cloud based system from being downloaded to the first cloud based system, at least one of the a plurality of files associated with the second cloud based system being configured for manipulation using the application executing on the first cloud based system;
after preventing the plurality of files associated with the file storage system from being downloaded, generating, at the first cloud based system, in response to a communication from a client device operating the application executing on the first cloud based system the client device being remote from the first cloud based system, an open file window for display on the client device, the open file window being based on the metadata;
communicating the open file window from the first cloud based system to the client device for display on the client device in association with the application; and
receiving at the first cloud based system from the client device a selection to open one of the plurality of files prevented from being downloaded to the first cloud based system, the open file window operating in association with the application;
determine the selected one of the plurality of files prevented from being downloaded is stored on the second cloud based system separate from the first cloud based system;
in response to determining the selected one of the plurality of files prevented from being downloaded is stored on the second cloud based system, trigger, by the first cloud based system, a download of the one of the plurality of files prevented from being downloaded.

18. The method of claim 17, further comprising:
storing at least one of the files associated with the second cloud based system;
determining if one of the at least one of the files associated with the second cloud based system has changed; and
if one of the at least one of the files associated with the second cloud based system has changed, synchronizing the changes with a corresponding file on the second cloud based system.

19. The method of claim 17, further comprising:
receiving, at the first cloud based system, a request to launch an application;
generating, by the first cloud based system, a virtual machine in response the request; and
launching, by the virtual machine, the application, wherein the virtual machine includes an associated memory allocated to store the metadata and a cache to store files associated with the metadata.

20. The method of claim 17, further comprising:
storing an indication of a change to a file stored on the first cloud based system;
storing changes to the file stored on the first cloud based system; and
communicating at least one of the indication and the changes to the file to the second cloud based system.

* * * * *